Patented May 21, 1929.

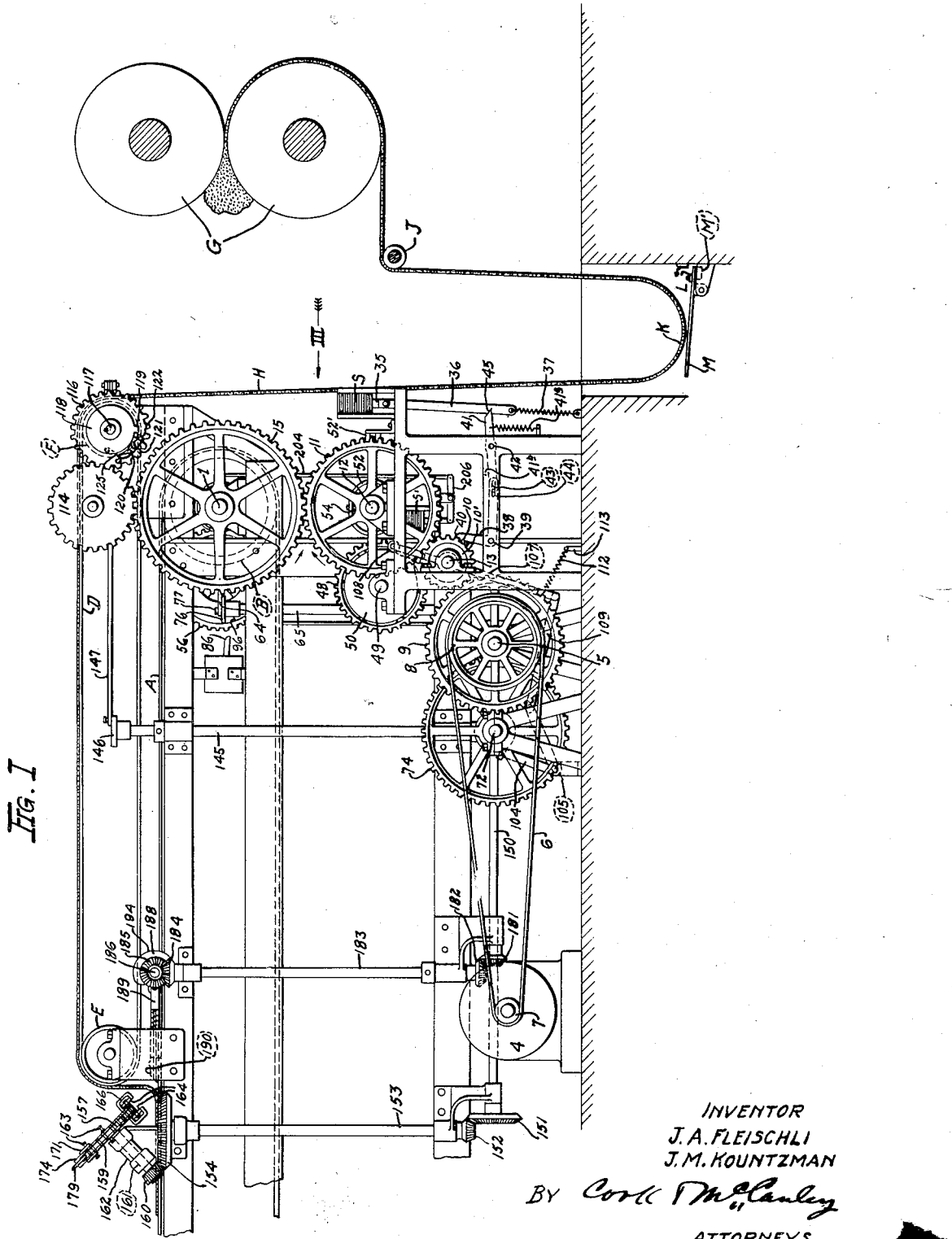

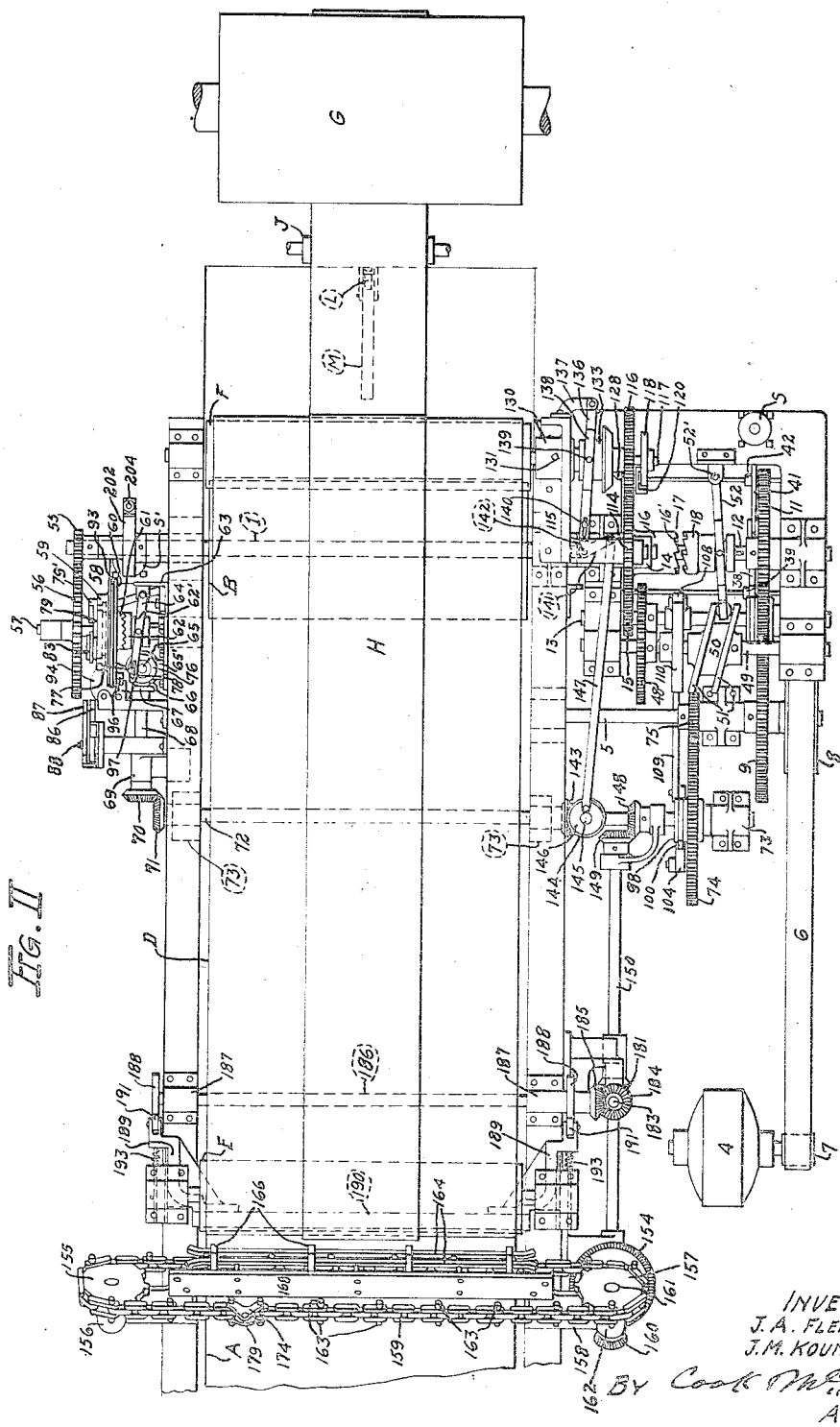

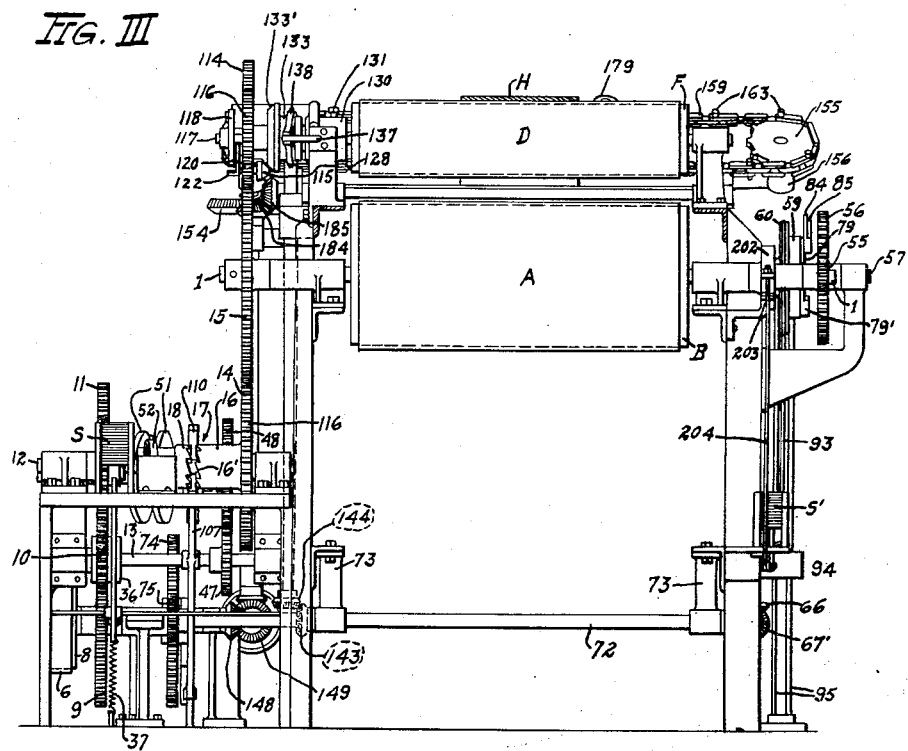

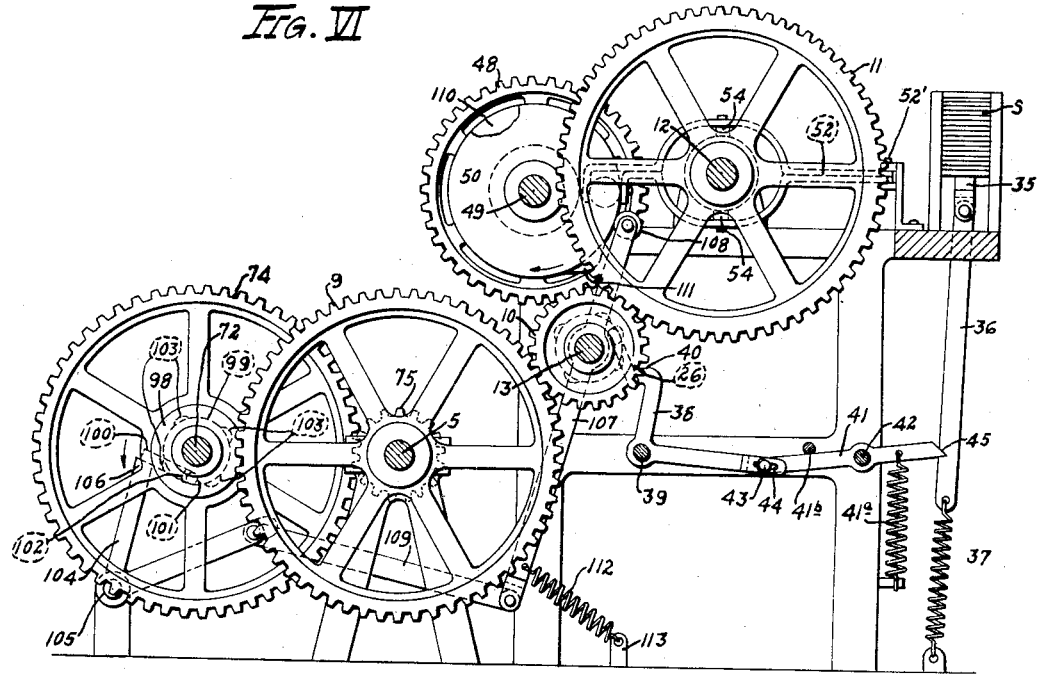
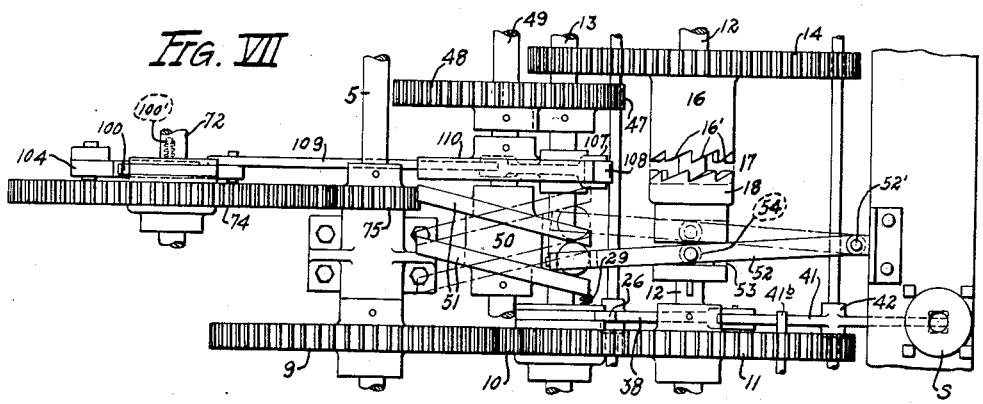

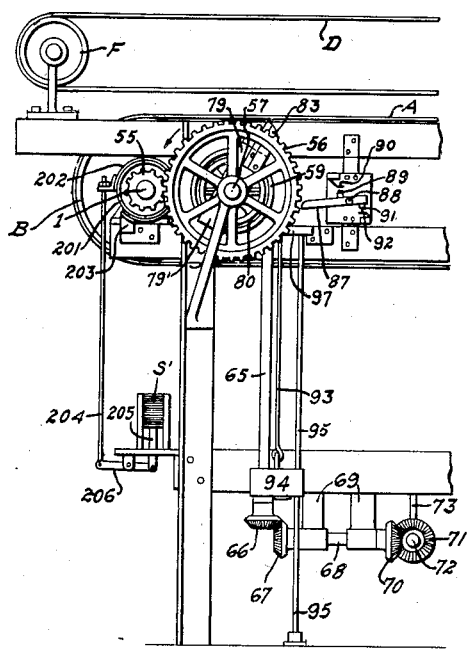
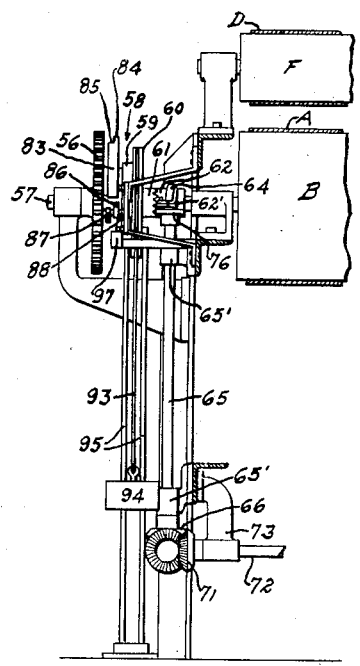
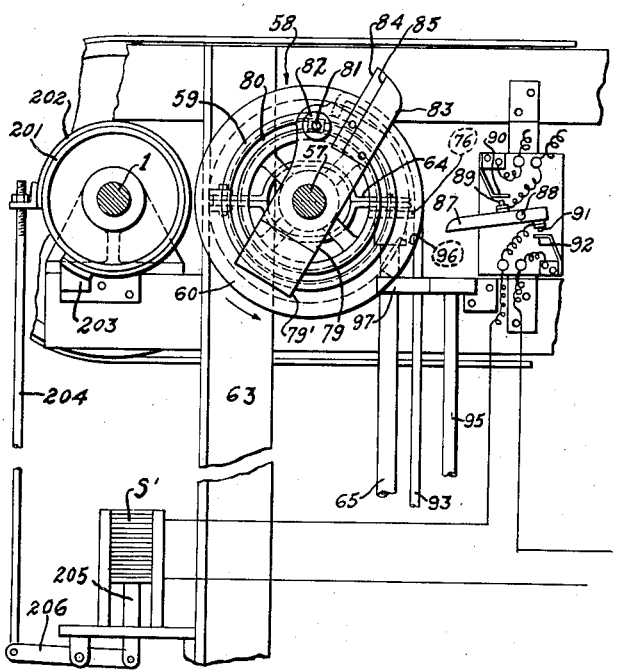

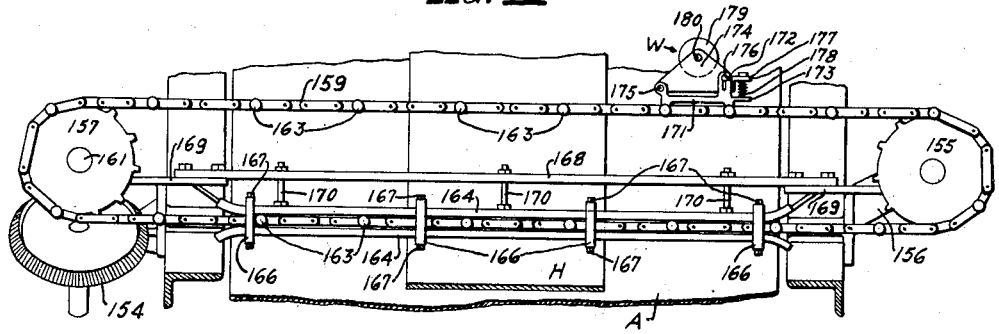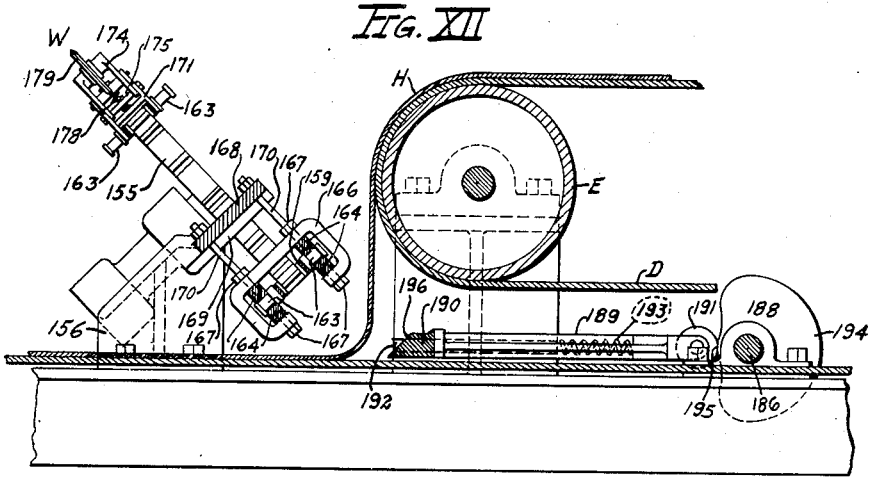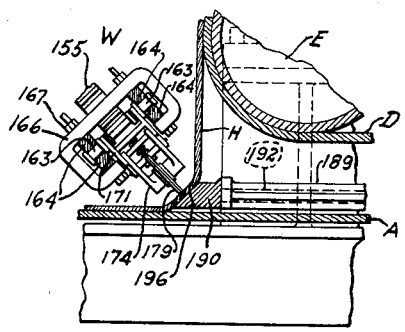

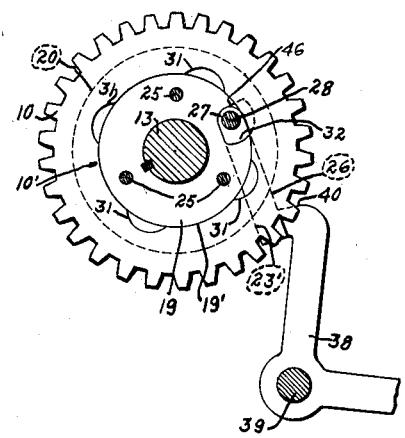
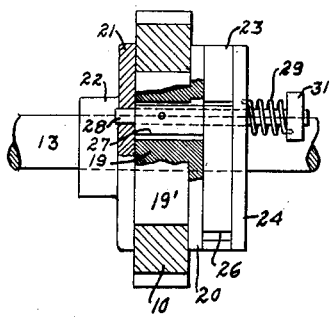
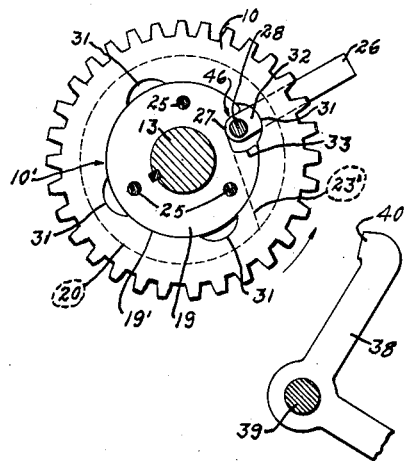
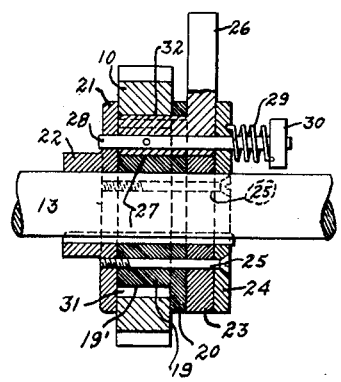
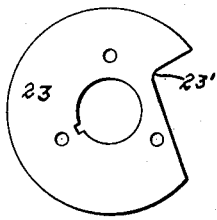

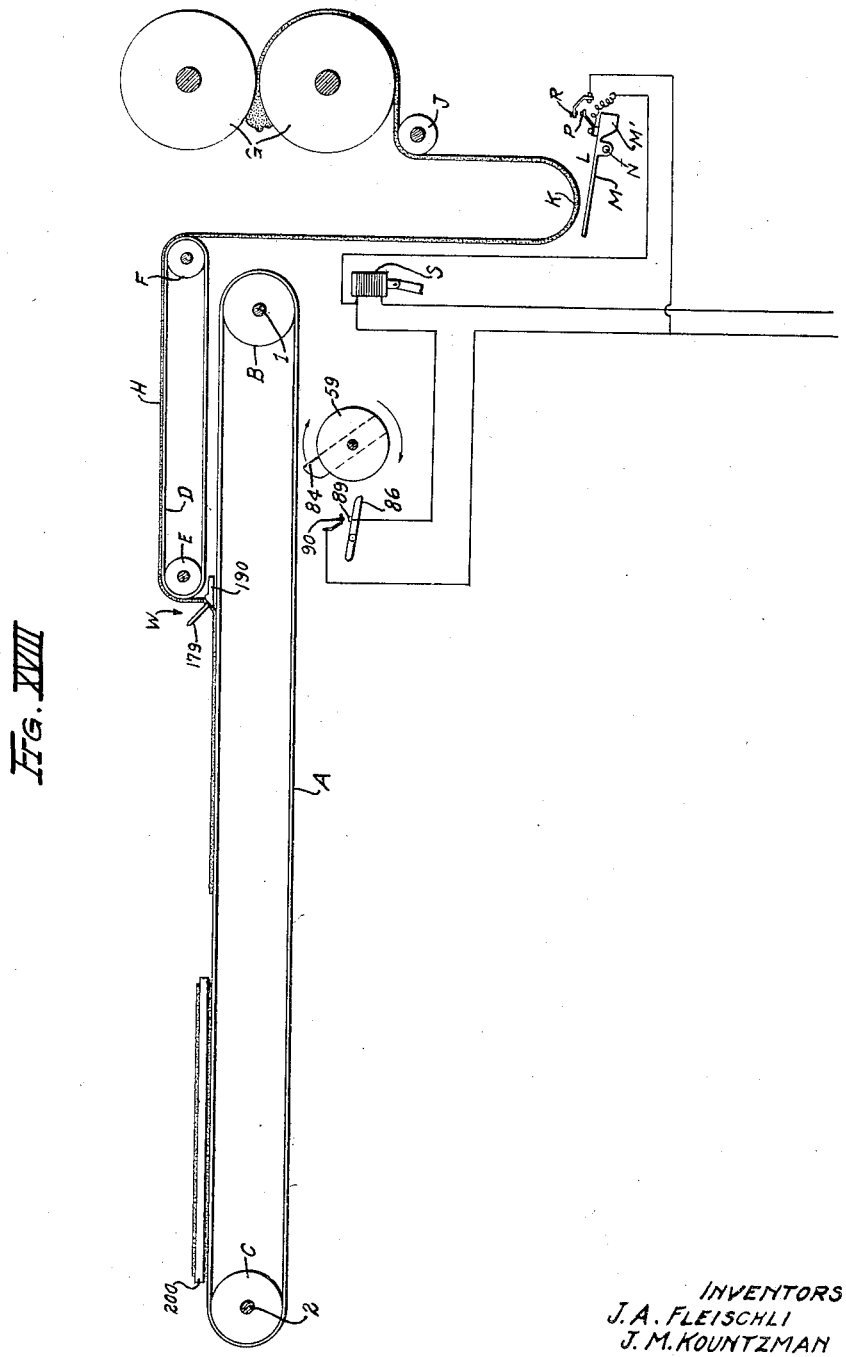

1,713,958

UNITED STATES PATENT OFFICE.

JOHN A. FLEISCHLI, OF CLAYTON, AND JOSEPH M. KOUNTZMAN, OF ST. LOUIS, MISSOURI, ASSIGNORS TO CUPPLES COMPANY, OF ST. LOUIS, MISSOURI, A CORPORATION OF MISSOURI.

APPARATUS FOR MAKING RUBBER TUBES.

Application filed December 7, 1925. Serial No. 73,647.

This invention relates generally to apparatus for making rubber tubes and more particularly to an improved automatic apparatus through the use of which certain steps in the manufacture of rubber tubes, for instance of the tubes used in pneumatic tires, may be performed as a continuous operation, instead of as isolated operations as heretofore. Prior to this invention rubber tubes have been made by shaping sheets of rubber around suitably shaped mandrels, and the preliminary operations have consisted in passing compounded rubber material between calendar rolls to form a sheet or strip of rubber, which passed to winding reels where the sheet or strip of rubber was wound to form large rolls. In carrying out this old method a strip of non-adhesive protective material was wound up with the rubber to prevent cohesion that would solidify the mass of plastic material. The rolls of sheet rubber were then carried away from the sheet-forming department and placed in storage until required for the manufacture of tubes. Thereafter the rolls of sheet material were withdrawn from storage and placed upon a stationary table, where they were unrolled and cut into sections of the length desired for tubes.

One of the objects of the present invention is to produce an automatic apparatus adapted to be arranged adjacent to the sheet-forming rolls and which, when so positioned, will cooperate with said sheet-forming rolls to automatically perform in a single continuous operation the operation of converting the compounded rubber material into sheet form, the measuring of the sheet of rubber to determine the length of the various sections into which said sheet is to be cut, and the cutting of said sheet into sections. The apparatus also provides a bed on which the severed sections of the sheet may be rolled into tubes. It is apparent, in view of the foregoing, that the employment of our improved apparatus eliminates the numerous intermediate operations heretofore involved in winding, storing and unwinding the sheet material, and also the use of the non-adhesive protective strip is dispensed with.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Briefly stated, our improved apparatus comprises means arranged to receive the sheet or strip of rubber as it passes from the sheet-forming rolls. The sheet-forming rolls are constantly rotated, so that the strip is uninterruptedly fed from said rolls, but the means which receive said strip from the rolls are intermittently operated. The intermittently operated means receive the sheet of rubber from the sheet-forming rolls and carry said sheet a predetermined distance, when movement of the sheet-carrying means is stopped and the free end portion of said sheet is severed from the sheet. The apparatus includes means whereby the length of the section severed from the sheet is automatically determined, and said apparatus also includes means whereby a space is provided between the portion severed from the sheet and the main body of the sheet. Due to the fact that there is a constant delivery from the rolls while an intermittent motion is imparted to the free end of the strip, some precaution must be taken to prevent mutilation or adhesion of the intermediate portion of the strip. We therefore permit the intermediate portion of the strip to hang free in the form of a loop and the intermittent motion of the free end portion of the strip merely varies the size of this depending loop.

The rubber strip is thus formed and immediately cut into sections of the desired length, and these sections may be immediately shaped to form tubes.

Fig. I is a side elevation of our improved apparatus with the calendar rolls with which said apparatus is associated shown in more or less diagrammatical form.

Fig. II is a plan view of the apparatus shown in Fig. I.

Fig. III is an end elevation of the apparatus looking in the direction indicated by the feathered arrow in Fig. I, the strip of rubber being shown in section.

Fig. IV is a fragmentary detail of the clutch mechanism controlling the movement of the upper belt of our apparatus.

Fig. V is a vertical section on line V—V of Fig. IV.

Fig. VI is a side elevation of a part of the gearing for transmitting motion to the belts.

Fig. VII is a plan view of the mechanism illustrated in Fig. VI.

Fig. VIII is a fragmentary detail illustrating the mechanism by means of which the electrical device for controlling the operation of the belts is actuated.

Fig. IX is a fragmentary vertical section illustrating the mechanism shown in Fig. VIII.

Fig. X is a fragmentary detail on a slightly enlarged scale showing a portion of the mechanism illustrated in Figs. VIII and IX, particularly the pulley over which the weight-supporting cable shown in the views mentioned operates.

Fig. XI is a fragmentary detail illustrating the cutting mechanism of our improved apparatus.

Fig. XII is a longitudinal fragmentary section showing the mechanism illustrated in Fig. XI.

Fig. XIII is a view of some of the mechanism illustrated in Fig. XII but showing certain of the parts in changed positions.

Fig. XIV is a fragmentary detail showing a one-revolution clutch mechanism forming a part of our apparatus.

Fig. XV is an end view partly in elevation and partly in vertical section, showing the mechanism illustrated in Fig. XIV and with the parts thereof in the positions they occupy in Fig. XIV.

Fig. XVI is a fragmentary detail showing the one-revolution clutch mechanism illustrated in Figs. XIV and XV as said mechanism will appear when certain of the parts thereof are in changed positions.

Fig. XVII is a fragmentary section of the mechanism shown in Fig. XVI showing the parts thereof in the positions in which they appear in Fig. XVI.

Fig. XVIII is a diagrammatical view of our improved apparatus.

Fig. XIX illustrates a collar forming a part of the clutch mechanism shown in Figs. XIV, XV, XVI and XVII.

Preliminary to describing the details of construction of our improved apparatus and setting forth the particular arrangement of the various mechanisms comprising said apparatus, we will refer to Fig. XVIII of the drawings, and in connection therewith will very briefly describe the operation of the apparatus so that when the various mechanisms are described in detail their positions in the complete structure and their functions will be more readily understood.

Referring now to the view mentioned, A designates an endless belt which operates over pulleys B and C. The endless belt A may be made of any suitable material, such, for instance, as canvas, and is of substantial width, as shown in Fig. II of the drawings. Arranged immediately above the endless belt A and at one end thereof is a comparatively short endless belt D, said endless belt D, as is the case in connection with the belt A, being formed of canvas or other suitable material, and being arranged to travel over pulleys E and F. The endless belt D is of approximately the same width as the endless belt A. By referring to Fig. XVIII it will be noted that the forward end portion of the endless belt D extends outwardly in a horizontal direction beyond the forward end portion of the endless belt A.

G designates calendering or sheet-forming rolls between which compounded rubber material is passed to produce a strip or sheet of rubber, as designated by the reference character H. After leaving the rolls G the strip or sheet of rubber H passes over a guide roll J and then extends downwardly in the form of a loop K, the free end of said strip or sheet of rubber being supported by the endless belt D. L designates an electrical switch which is arranged immediately below and in alinement with the loop of rubber K, said electrical switch comprising a member M pivoted at the point indicated by the reference character N to a stationary support. The pivoted member M is provided with a contact member P, which is adapted to contact with a stationary contact member R, whereby an electrical circuit is closed through which electrical energy passes to a solenoid S whereby said solenoid is energized. The solenoid S is connected by means of suitable mechanism, which will subsequently be described in detail, to a clutch mechanism by means of which movement of the belt A is controlled, and when said solenoid is energized by the depression of the pivoted member M of the switch L the belt A is placed in motion.

In the operation of the apparatus the loop of rubber K moving downwardly from the constantly rotating sheet-forming rolls G depresses the pivoted member M whereby electrical contact is made between the contact members P and R, whereby the solenoid S is energized and the belt A placed in motion. The belt A travels a predetermined distance while the upper belt D is stationary. After the belt A has traveled said predetermined distance the upper belt D is automatically placed in motion through the operation of certain mechanism to be subsequently described, and thereafter both belts A and D travel at the same time and at the same speed to feed the material. When both belts have moved forward a predetermined distance a pair of electrical contact members 89 and 90 are brought into contact with each other and the solenoid S is again energized to stop the motion of the belts A and D.

W designates the cutting mechanism of the apparatus which travels transversely of the strip of rubber A and which includes a rotary cutting disk 179 and a cutting bar 190. During the period that both of the belts A and D are at rest following the actuation of the solenoid S, the cutting bar 190 is moved forwardly and the rotary cutting disk 179 moves transversely of the apparatus in contact with the cutting bar 190, whereby the end portion of the strip of rubber is severed from the body of said strip. After the cutting operation has been completed the cutting bar is restored to its original position and the cutting mechanism is stopped. Immediately after the cutting operation has been completed the loop K, which has been moving downwardly from the contsantly rotating sheet-forming rolls G, contacts with the pivoted member M of the switch L, whereupon the solenoid S is again energized and the lower belt A is placed in motion to move while the belt D is stationary, as already described.

With this brief preliminary description of the operation of the apparatus it is thought that the details of construction of the apparatus, which will now be described, will be more readily understood.

Our improved apparatus includes a suitable frame by means of which the various mechanisms making up the apparatus are supported, said frame supporting rotatable shafts 1 and 2 on which the pulleys B and C are mounted. The pulleys B and C constitute the means for supporting the endless belt A and the shaft 1 is the drive shaft by means of which motion is transmitted to the endless belt A.

4 designates a motor or other prime mover which transmits rotary motion to a shaft 5 arranged transversely of the apparatus through the medium of a driving belt 6 operating over a pulley 7 associated with said prime mover and a pulley 8 on said shaft 5. The shaft 5 also has a gear wheel 9 rigidly fixed thereto which meshes with an intermediate gear ring 10, and said gear ring 10 in turn meshes with a gear wheel 11 fixed to a transversely arranged shaft 12. The prime mover 4 is in continuous operation during the operation of the apparatus, and therefore the gear wheel 9 and gear ring 10 will impart continuous rotary motion to the gear wheel 11. It may be well at this point to point out that the gear ring 10 is capable of rotating independently of the portion 10' which is surrounded by said gear ring. The portion 10' is rigidly fixed to a shaft 13 and subsequently herein it will be explained how said portion 10' may be connected to the gear ring 10 to cause rotary motion to be transmitted from said gear ring to said shaft 13.

Mounted on the shaft 12 is a gear wheel 14, said gear wheel being of approximately the same diameter as the gear wheel 11 and being spaced apart from said gear wheel 11 in a direction longitudinal of the shaft 12. The gear wheel 14 is loosely mounted on the shaft 12, that is to say, said gear wheel may rotate freely without imparting rotary motion to said shaft. Rigidly fixed to the shaft 1 on which the pulley B is mounted is a gear wheel 15, said gear wheel 15 being in mesh with the gear wheel 14, as shown clearly in Fig. III. The gear wheel 14 is provided with a hub portion 16 having teeth 16' whereby said hub portion 16 may function as a portion of a clutch 17. The associated portion of the clutch 17 comprises a member 18 which is splined to the shaft 12 so that said member 18 may slide longitudinally of said shaft but will rotate therewith. It is plain, in view of the mechanism just described, that when the shaft 12 is rotated by the gear wheel 9, gear ring 10, and gear wheel 11, the gear wheel 14 may be caused to rotate with said shaft 12 by engaging the clutch portions 16 and 18 of the clutch 17. It is also plain that when said clutch portions are disengaged as shown in Fig. VII, the gear wheel 14 will remain stationary, the shaft 12 rotating relative to said gear wheel. The gear wheel 15 is fixed to the shaft 1 and the pulley B is also fixed to said shaft. Also, as has already been stated, and as shown in Fig. III, the gear wheel 15 meshes with the gear wheel 14. It is therefore apparent that the operation of the belt A may be controlled while the shaft 14 is rotating by merely moving the clutch members 16 and 18 of the clutch 17 into and out of engagement with each other.

It has already been stated that the gear ring 10 is capable of independent rotation relative to the member 10' which is surrounded by said gear ring 10. However, our improved apparatus includes means whereby said gear ring 10 and said member 10' may be connected together, so that the rotary motion of said gear ring may be imparted to the shaft 13, and this means will now be described.

The mechanism of which the gear ring 10 forms a part is a one-revolution clutch mechanism. In other words, upon the engagement of said clutch mechanism the shaft 13 will be rotated one revolution and will then stop. By referring now to Figs. XIV, XV, XVI and XVII, it will be noted that a member 19 is keyed to the shaft 13. This member 19 is provided with a cylindrical portion 19', on which the gear ring 10 is mounted for rotation, and an annular flange portion 20 located adjacent to the side face of the gear ring 10. Located adjacent to the opposite face of the gear ring 10 is an annular flange 21 which is formed on a member 22. It is apparent that the arrangement of the flanges 20 and 21 in combination with the cylindrical portion 19′ of the member 19 provides an annular recess in which the inner portion of the gear ring 10 is located, and it is apparent that said gear ring is free to rotate in said recess without imparting motion to any of the associated elements. 23 designates a collar of approximately the same diameter as the annular flange portion 20, and 24 designates a plate which is located in contact with a side face of the collar 23, as shown in Fig. XVII. The member 19, the member 22, collar 23 and plate 24 are secured together in any suitable manner, as, for instance, by means of screws 25, and said elements comprise a unit which is keyed to the shaft 13 and rotates therewith.

26 designates an arm provided with a bearing portion 27, said bearing portion having an opening formed longitudinally therethrough through which a short shaft 28 passes. The bearing portion 27 of the arm 26 is interposed between the annular flange 21 and the plate 24, but the shaft 28 extends through openings in said flange 21 and plate 24 so that said shaft is rotatably supported in said openings. It is plain, in view of the arrangement just described, that the bearing portion 27 and arm 26 are capable of rotary movement about the shaft 28. The bearing portion 27 of the arm 26 is preferably formed integral with said arm and said bearing portion is secured by means of a pin or otherwise to the shaft 28. 29 designates a torsional coil spring which is interposed between the plate 24 and a collar 30 on the shaft 28, one end of said spring being fastened to said plate 24 and the other end of said spring being fastened to said collar. Energy is stored up in the torsional coil spring 29 which tends to rotate the shaft 28 in a direction to cause the arm 26 to be moved to the position in which said arm is shown in Fig. XVI.

By referring now to Figs. XIV and XVI it will be noted that the gear ring 10 has a plurality of arcuate notches 31 formed in the inner face thereof. It will also be noted from the views mentioned that the bearing portion 27 of the arm 26 includes the extended portion 32 which is of such length that it extends beyond the peripheral face of the cylindrical portion 19′ of the member 19 when the arm is in the position in which it is shown in Fig. XVI. Also, the member 19 is provided with an irregularly shaped recess 33 of such shape and size that the entire bearing portion 27, including the extended portion 32 thereof, may be located entirely within the circumferential margin of the cylindrical portion 19′ of the member 19, as shown in Fig. XIV. The collar 23 is provided with a cut-out portion 23′, as shown in Fig. XIX, in which the arm 26 is located, said cut-out portion being of such shape as to permit the arm 26 to move from the position in which it is shown in Fig. XIV to the position in which it is shown in Fig. XVI.

S designates a solenoid which is provided with the usual core 35, said core having an arm 36 pivotally attached thereto at its lower end. 37 designates a coil spring which forms flexible connecting means whereby said arm is secured to a stationary element and said coil spring tends to draw the arm 36 and core 35 downwardly. 38 designates a bell crank lever pivoted to the frame of the apparatus at the point indicated by the reference character 39, said bell crank lever having an offset nose portion 40 as shown in Figs. VI, XIV and XVI. 41 designates an arm pivoted at 42 to the frame of the apparatus, said arm 41 being provided with a pin 43 at one of its ends which passes through a slot 44 at the end of a leg of the bell crank lever 38 (Fig. VI). The end of the arm 41 opposite to the end thereof which is provided with the pin 43 terminates in a point which is seated in a notch 45 in the arm 36 attached to the core of the solenoid S.

41ª designates a coil spring which tends to draw the rearmost end portion of the arm 41 downwardly, one end of said coil spring being attached to said arm 41 and the opposite end of said coil spring being attached to a stationary element supported by the frame of the apparatus. 41ᵇ designates a stop element which is adapted to limit the upward movement of the forward portion of the arm 41.

It will be noted that when the parts just described are in the positions in which they are shown in Fig. VI the arm 26 of the one-revolution clutch mechanism associated with the gear ring 10 is in contact with the nose portion 40 of the bell crank lever 38, and consequently said nose portion of said bell crank lever will prevent the torsional coil spring 29 from swinging said arm 26 upwardly to the position in which it is shown in Fig. XVI. As a result of the position of the arm 26 when it is contacting with the nose portion of the bell crank lever, as shown in Figs. VI and XIV, the extended portion 32 of the bearing portion 27 of said arm is located entirely within the circumferential margin of the cylindrical portion 19′ of the member 19, and therefore the gear ring 10 may rotate relative to said member 19 without imparting movement thereto. Assume, however, that the switch L is operated by being depressed by the loop of rubber K, and that electrical energy is therefore caused to pass to the solenoid S, whereby said solenoid is energized and the core 35 thereof moved upwardly. The upward movement of the core 35 will draw the arms 36 upwardly, and because the pointed end of the arm 41 projects into the notch 45 in said arm 36 said pointed end of said pivoted arm 41 will be moved upwardly with said arm 36 and the opposite end of the arm 41 will consequently be moved downwardly. The downward movement of the forward end of the arm 41 will impart like movement to the rearmost end of the bell crank lever 38 whereby the nose portion 40 of said bell crank lever will be moved in a direction away from the arm 26 of the clutch mechanism. Upon movement of the nose portion of the bell crank lever 38 as described, the torsional coil spring 29 will immediately swing the arm 26 in an arc of a circle from the position in which said arm 26 is shown in Fig. XIV to the position in which said arm is shown in Fig. XVI. The gear ring 10 is rotating in the direction indicated by the arrow in Fig. XVI at the time the movement of the arm 26 just described takes place, and the extended portion 32 of the bearing portion of said arm will enter the first notch 31 in said gear ring which is presented. The result of this will be that the member 19 will be locked with the gear ring 10 and will rotate therewith, motion being transmitted from the gear ring through the bearing portion 27 of the arm, which contacts with the abutment face 46 to prevent further rotary movement of said bearing portion, to the member 19, and because said member 19 is fixed to the shaft 13 said shaft will likewise be rotated.

When the solenoid S is energized and the arm 36 is moved upwardly, the rearmost end of the arm 41 will move upwardly with said arm 36 until the pointed end of said arm 41 escapes from the notch 45, whereupon the coil spring 41ᵃ will draw the rearmost end portion of the arm 41 downwardly independently of the arm 36 until the forward portion of said arm 41 strikes the stop element 41ᵇ. When the coil spring 41ᵃ draws the arm 41 downwardly, the pointed end of said arm slides along the edge of the arm 36, said arm 36 being moved outwardly because of the slight arc of a circle in which the pointed end of the arm 41 moves. When the loop of rubber K is shortened by the sheet of rubber being fed forwardly by the belts A and D said loop K is drawn away from the pivoted member M, the weighted portion M' of said pivoted member causing the rearmost end of said member to drop downwardly, thus breaking the contact between the electrical contact members P and R. The spring 37 will thereupon pull the arm 36 downwardly to a point where the pointed end of the arm 41 may again enter the notch 45 in said arm. The operation of moving the nose portion of the bell crank lever 38 away from the arm 26 and the operation of restoring said nose portion to its original position are performed before the clutch mechanism associated with the gear ring 10 has completed one revolution, and therefore when the radially extended arm 26 has moved around to the position occupied by the nose portion of the bell crank lever 38 said arm will contact with the restored nose portion of the bell crank lever, and as the pivoted point of said arm continues to travel in an arc of a circle a short distance said arm 26 will be moved to the position in which it is shown in Fig. XIV, thereby withdrawing the extended portion 32 of the bearing portion of the arm 26 from the notch 31, thus disconnecting the gear ring 10 from the member 19.

Fixed to the shaft 13 on which the one-revolution clutch mechanism already described is mounted is a pinion 47, said pinion 47 being in mesh with a gear wheel 48 fixed to a shaft 49. Fixed to the shaft 49 is a cam 50 comprising a pair of annular flanges 51 spaced apart to provide a space therebetween. 52 designates an arm pivotally secured to a stationary part of the apparatus at the point indicated by the reference character 52'. The end of the arm 52 opposite to the pivoted end thereof is provided with an antifriction ball or roller which is secured in any suitable manner to said arm and which is located in the space between the annular flanges 51 of the cam 50, as shown in Fig. VII. The clutch member 18 forming a part of the clutch 17 already referred to is provided with an annular groove 53, and the arm 52 is provided with a yoke portion which surrounds the portion 18 of the clutch 17. The arm 52 is provided with oppositely disposed antifriction rollers 54, which extend inwardly from the yoke portion thereof into the annular groove 53 in the clutch member 18 so that said clutch member may be moved longitudinally of the shaft 12 by said arm 52.

In view of the arrangement just described and because of the shape of the cam 50, one-half revolution of the shaft 49 will cause the arm 52 to be moved so that the teeth of the clutch member 18 will be moved into engagement with the teeth of the clutch member 16. Another half of a revolution of the shaft 49 will move the arm 52 so that the clutch member 18 will be restored to its original disengaged position.

Rigidly fixed at one end of the shaft 1 on which the pulley B is mounted is a pinion 55 which meshes with a gear wheel 56 fixed to a shaft 57, said shaft 57 being supported in suitable bearings secured to the frame of the apparatus. Loosely mounted on the rotatable shaft 57 is a unit 58 comprising a disk 59, a pulley 60 and a clutch portion 61 provided with suitable teeth. The elements of the unit 58 may be formed integral with each other, or said elements may be secured together in any convenient manner. In either event, however, said elements rotate as a unit. 62 designates a clutch portion provided with suitable teeth adapted to mesh with the teeth of the clutch portion 61 of the unit 58, said clutch portion 62 being splined to the shaft 57 so that it will rotate therewith but may move longitudinally thereof.

63 designates an angle bar which extends vertically of the apparatus at a point adjacent to the shaft 57. Pivotally fixed to the angle bar 63 is an arm 64, said arm being provided with a yoke portion which surrounds a portion of the clutch portion 62, and said yoke portion of said arm is provided with inwardly extended pins which extend inwardly into an annular groove 62' formed in the clutch portion 62, whereby movement of said arm will cause the clutch portion 62 to move longitudinally of the shaft 57. Arranged vertically of the apparatus in close proximity to the shaft 57 is a shaft 65 arranged for rotation in suitable bearings 65'. The shaft 65 is provided with a bevel gear 66 at its lower end which meshes with a bevel gear 67 fixed to a short shaft 68 arranged longitudinally of the apparatus and adapted to rotate in suitable bearings 69. The shaft 68 has a bevel gear 70 fixed thereto at the end thereof which is opposite to the end at which the bevel gear 67 is arranged, said bevel gear 70 meshing with a bevel gear 71 secured to an end of a shaft 72 arranged transversely of the apparatus, as shown in Fig. II. The transversely arranged shaft 72 arranged for rotation in suitable bearings 73, and said shaft is provided with a relatively large gear ring 74. The gear ring 74 is capable of rotating independently of the elements which are located within said gear ring, and also said gear ring may be connected to the elements surrounded thereby so that said gear ring and the elements located within the same may rotate as a unit. The gear ring 74 just referred to is arranged in mesh with a pinion 75 which is fixed to the shaft 5 on which the pulley 8 and gear wheel 9 are mounted.

Fixed to the vertically arranged shaft 65 at the upper end thereof is a disk 76. The disk 76 is provided with an upwardly extended pin 77 which passes through an elongated slot 78 in the arm 64. In view of the mechanism just described it is apparent that when the shaft 72 is rotated the shaft 68 and the vertical shaft 65 will likewise be rotated, with the result that the rotating pin 77 will oscillate the pivoted arm 64 and this arm will in turn move the clutch portion 62 into and out of engagement with the clutch portion 61 forming a part of the unit 58.

By referring now to Fig. X it will be noted than an arm 79 is supported by the shaft 57 on which the unit 58 is mounted, said arm 79 being capable of rotary movement about said shaft 57. The arm 79 is arranged in contact with the disk portion 59 of the unit 58, as shown in Fig. II, and said arm is provided with a weighted end portion 79'. Formed in the face of the disk portion 59 adjacent to which the arm 79 is located is an annular groove 80, which is preferably T-shaped in cross-section. 81 designates a bolt having a head which is arranged within the T-shaped groove 80, said bolt being passed through an aperture in the arm 79 and having a thumb nut 82 arranged on its threaded outer portion. The thumb nut 82 is capable of being screwed inwardly on the bolt 81 until it contacts with the face of the arm 79, and because the action of screwing the thumb nut inwardly on the bolt will draw the head of the bolt 81 firmly against the outer wall of the annular groove 80 and will at the same time cause the thumb nut to bear against the outer face of the arm 79, said arm 79 will be prevented from moving relative to the disk portion 59 of the unit 58. It is plain that if desired the position of the arm 79 may be changed by unscrewing the thumb nut 82 and rotating the arm 79 about the shaft 57, said thumb nut being tightened when the arm has been arranged in the desired position to rigidly fix said arm in such position. Fixed to the arm 79 is an extension 83, said extension having an abutment face 84 and an abutment face 85 which are intended for a purpose to be hereinafter set forth.

86 and 87 designate switch members by means of which circuits through which electrical energy passes are made and broken. The switch members 86 and 87 are arranged side by side as shown in Fig. II and are pivotally supported by a common pivot 88. The pivoted switch member 86 is provided with an electrical contact member 89 adapted to be brought into contact with a stationary contact member 90, and the pivoted switch member 87 is provided with an electrical contact member 91 adapted to contact with a stationary contact member 92. Because of the arrangement of the contact members 89 and 91 on the switch members 86 and 87 relative to the pivotal points of said switch members, it is apparent that the upward movement of the outer ends of said switch members, that is, the ends adjacent to the arm 79, will cause the contact members supported by said switch members to be moved into contact with the stationary contact members 90 and 92, thus completing electrical circuits of which said contact members form parts.

93 designates a flexible member one end of which is fixed to the pulley portion 60 of the unit 58. The pulley portion 60 is provided with a grooved circumferential face, and said flexible member 93 passes around said pulley and is arranged in the groove in the face thereof. Secured to the lower end of the flexible member 93 is a weight 94 (Fig. VIII), said weight being provided with a pair of vertically arranged apertures formed therethrough through which stationary vertically arranged rods 95 pass (Fig. IX), said rods being intended to prevent the weight 94 from swinging. The weight 94 is adapted to return the unit 58 to its original position after said unit has been moved during the operation of the apparatus, and to provide means whereby said unit will come to rest in a predetermined position we provide said unit with a stop element 96, which is arranged on and extends outwardly from the pulley portion of said unit. The stop element 96 is so arranged that it will contact with a stationary part 97 of the frame of the apparatus, and thus stop rotation of the unit 58.

By referring to Figs. II and VI it will be noted that a one-revolution clutch mechanism 98, which is an exact counterpart of the one-revolution clutch mechanism associated with the gear ring 10 and which has already been described, is associated with the gear ring 74. The clutch mechanism 98 includes a member 99 rigidly fixed to the shaft 72 so that it will rotate therewith. Supported by the member 99 is an arm 100 which has a bearing portion 101 provided with an extended portion 102. The bearing portion 101 is capable of rotary movement in an opening in the member 99, and as the arm 100 forms an integral part of said bearing portion said arm may swing in an arc of a circle, as already described in connection with the arm 26 of the clutch mechanism associated with the gear ring 10. 103 designates a plurality of notches formed in the inner face of the hub portion of the gear ring 74 (Fig. VI), and 100' designates a torsional coil spring which is arranged with relation to the parts of the one-revolution clutch 98 just as the torsional coil spring 29 is arranged with relation to the parts of the one-revolution clutch mechanism associated with the gear ring 10. In other words, the torsional coil spring 100' tends to move the arm 100 in an arc of a circle in the direction indicated by the arrow in Fig. VI.

104 designates a bell crank lever which is pivoted at the point indicated by the reference character 105 to a stationary element, said bell crank lever having a nose portion 106 which is normally arranged in the path of travel of the arm 100. Pivotally mounted on the shaft 13 is an arm 107, said arm being provided with an antifriction roller 108 at its upper end. 109 designates a link which connects the lower end of the arm 107 to a leg of the bell crank lever 104. Fixed to the shaft 49 is a cam 110 provided with a raised spot 111, said cam being concentric with the shaft 49 except for said raised spot (Fig. VI).

It is apparent, in view of the mechanism just described, that if the raised spot 111 on the cam 110 moved the upper end of the pivoted arm 107 rearwardly the lower end of said arm 107 will be moved in the opposite direction. The movement of said arm 107 will impart forward movement to the bell crank lever 104, which will have the effect of moving the nose portion 106 of said bell crank lever in a direction away from the arm 100, thus permitting the torsional coil spring 100' to swing the arm 100 in the direction indicated by the arrow in Fig. VI. The gear ring 74 is rotating at the time the movements just described are taking place, consequently the extended portion 102 on the bearing portion 101 of the arm 100 will be moved into the first notch 103 which is presented, and the action of said extended portion moving into said notch will lock the member 99 to the gear ring 74 and thus cause the shaft 72 to rotate with said gear ring 74. 112 designates a coil spring, one end of which is secured to the arm 107 at the lower end thereof and the other end of which is secured to a suitable stationary element 113. The spring 112 tends to draw the lower end of the arm 107 toward the stationary element 113 and thereby maintains the antifriction roller 108 at the upper end of said arm in contact with the circumferential face of the cam 110. In the operation of the apparatus the raised portion 111 on the cam 110 moves the nose portion 106 of the bell crank lever 104 out of the path of travel of the arm 100, and thereby causes the shaft 72 to rotate with the gear ring 74, as just described. However, as soon as the raised portion of the cam passes beyond the antifriction roller 108 the spring 112 will return the nose portion 106 of the bell crank lever 104 to its original position, and as a result when the clutch mechanism 98 has almost completed one revolution the arm 100 will strike the restored nose portion of the bell crank lever, and the continued movement of the bearing portion 101 which constitutes the pivotal point of the arm 100 will cause the free end of said arm to be moved rearwardly, thus withdrawing the extended portion 102 from the notch 103 in which it was seated, whereby the gearing ring 74 is disconnected from the shaft 72. It is apparent, therefore, that for each complete revolution of the shaft 49 the shaft 72 makes one complete revolution.

By referring now to Figs. I and IV it will be noted that the gear wheel 114 is arranged immediately above and in mesh with the gear wheel 15 on the shaft 1 which supports the pulley B. The pulley B, it will be remembered, constitutes one of the supporting elements for the endless belt A. The gear wheel 114 is supported by a suitable bearing 115 secured to the frame of the apparatus, as shown in Fig. II. 116 designates a gear ring which meshes with the gear wheel 114. The gear ring 116 is associated with mechanism fixed to the shaft 117 on which the pulley F, constituting one of the supporting elements for the endless belt D, is mounted, and said mechanism provides means whereby said gear ring, which is capable of independent movement relative to the shaft 117, may be rigidly fixed to said shaft, so that motion may be transmitted to said shaft through said gear ring. In Figs. I, II and IV 118 designates a disk which is fixed to the shaft 117 and is provided with a projection 119 which constitutes an abutment element. 120 designates a dog pivoted to the gear ring 116 at the point indicated by the reference character 121. The dog 120 is provided with an outwardly projecting nose portion 122 and an outwardly extended tail portion 123, said tail portion having a cam face 124 which is for a purpose to be hereinafter set forth. 125 designates a flat spring which contacts with the tail portion of the dog 120 so that said dog will be retained in any position to which it is moved, said spring 125, like the dog 120, being secured to the gear ring 116. The gear ring 116 is provided with an arcuate slot 126 formed therethrough, as shown in Fig. IV. Secured to the nose portion of the dog 122 and extended through the slot 126 is a pin 127, said pin being provided with a cone-shaped member 128 at its free end, as shown in Fig. V. The curvature of the slot 126 is such that when the dog 120 is moved about its pivot point the pin 127 will move longitudinally of said slot, the nose portion of the dog moving toward and away from the circumferential face of the disk 118. By referring to Fig. V it will be noted that a sleeve 129 surrounds the shaft 117, and this view shows also that said sleeve passes through a bearing 130 secured to the frame of the apparatus, to which bearing the sleeve 129 is fixed by means of a bolt 131. It is apparent from the arrangement shown in Fig. V that the sleeve 129 will remain stationary when the shaft 117 is rotated. At the outer end of the sleeve 129 said sleeve is provided with a reduced portion 129′, the reduction of the diameter of the sleeve at that point providing an annular shoulder 131. Also, an annular plate 132 is located at the reduced end of this sleeve 129, said plate being secured to said reduced end portion of said sleeve by means of suitable fastening devices and being of such diameter that it is extended beyond the circumferential face of said reduced portion of said sleeve. The gear ring 116 is provided with a hub opening at its center through which the reduced portion 129′ of the sleeve 129 passes, and said gear ring is provided with a reduced annular portion 116′ at said hub opening, which reduced annular portion 116′ is arranged between the shoulder 131 and the annular plate 132. It is apparent from the foregoing that an annular recess is formed in which the reduced portion 116′ of the gear ring may rotate, hence the gear ring 116 may rotate relative to the sleeve 129, and because of the presence of the shoulder 131 and the annular plate 132 said gear ring 116 may not move longitudinally of said sleeve.

133 designates a member having a conical face 133′ (Fig. V), said member having a cylindrical portion and being arranged on the sleeve 129 in a manner to permit said member to move longitudinally of said sleeve. The member 133 is provided with an annular groove 134 in which a pair of segments 135 is arranged. 136 designates an arm (Fig. II) which is pivoted to a bracket 137 secured to the frame of the machine. The arm 136 is provided with a yoke portion 138 which surrounds the annular groove 134 in the member 133, and pins 139 pivotally connect the segments 135 within said groove to said yoke portion of said arm, so that if the arm 136 were swung on its pivot the member 133 would be moved longitudinally of the sleeve 129. The end of the arm 136 opposite to the pivoted end thereof is provided with an elongated slot and extended through said slot is a pin 140 carried by a bell crank lever 141 pivoted to the frame of the apparatus at the point indicated by the reference character 142.

Fixed to the shaft 72 arranged transversely of the apparatus is a bevel gear 143 which meshes with a similar bevel gear 144 fixed to the lower end of a vertically arranged shaft 145. A disk 146 is fixed to the shaft 145 at the upper end thereof and rotates with said shaft. 147 designates an arm (Fig. II) one end of which is pivotally attached to the disk 146 and the other end of which is pivotally attached to a leg of the bell crank lever 141. It is apparent that if the shaft 72 were rotated a rotary motion would be imparted to the vertically arranged shaft 145 and disk 146 through the bevel gears 143 and 144. It is also plain that because the arm 147 is pivotally attached to the rotating disk 146 said arm would move longitudinally of the apparatus, thus swinging the bell crank lever 141 on its pivot in a manner to cause the slotted end of the arm 138, which is loosely attached to a leg of said bell crank lever, to be moved transversely with relation to the apparatus. The result of this movement of the arm 138 would be that the member 133 would be moved longitudinally of the sleeve 129 in a direction toward the outer end of said sleeve.

Fixed to the transversely arranged shaft 72 is a bevel gear 148 which meshes with a similar bevel gear 149 secured to a shaft 150 arranged longitudinally of the apparatus (Figs. I and II). At the opposite end of the shaft 150 is a relatively large bevel gear 151 which meshes with a bevel pinion 152 fixed to a vertically arranged shaft 153 at the lower end thereof. The vertically arranged shaft 153 has fixed to it at its upper end a relatively large bevel gear 154. 155 designates a sprocket wheel supported by a suitable bracket 156 secured to the frame of the apparatus at one side of the apparatus (Fig. XI), and 157 designates a similar sprocket wheel supported by a suitable bracket 158 secured to the frame of the apparatus at the opposite side of said apparatus. 159 designates a sprocket chain which operates over said sprocket wheels and is driven thereby. 160 designates a bevel pinion which meshes with the bevel gear 154 fixed to the upper end of the vertically arranged shaft 153, said bevel pinion 160 being secured to a shaft 161 at one end thereof, the sprocket wheel 157 being secured to the opposite end of said shaft 161. The shaft 161 passes through an elongated bearing 162 forming a part of the bracket 158, so that the pinion 160, shaft 161, and sprocket wheel 157 may rotate as a unit.

Arranged transversely of the apparatus adjacent to the sprocket chain 159 is a plurality of bars which comprise guideways through which antifriction rollers 163, carried by said sprocket chain at the opposite side faces thereof, pass. The guideways mentioned comprise pairs of elongated bars 164 arranged transversely of the apparatus and spaced apart from each other to provide elongated spaces longitudinally of and parallel with the lowermost flight of the sprocket chain 159. The pairs of bars 164 are arranged adjacent to the side faces of the lowermost flight of the sprocket chain, as shown in Fig. XII, in such positions that the anti-friction rollers 163 at said side faces of said sprocket chain may pass through the spaces between said pairs of bars, and said bars 164 are provided with outwardly flared end portions, as shown in Fig. XI. The pairs of bars 164 are maintained in their proper positions by substantially C-shaped members 166 which are spaced apart from each other in a direction longitudinally of said bars, as shown in Fig. XI, there being bolts 167 which pass through said C-shaped members and screw into said bars to secure said bars to said members 166. 168 designates a plate arranged transversely of the apparatus, said plate being supported at its opposite ends by suitable brackets 169 secured to the frame of the apparatus. The unit comprising the bars 164 and the C-shaped members 166 is supported by the transversely arranged plate 168, there being bolts 170 extended from said plate 168 to certain of said bars. It is apparent from the foregoing that the guiding bars 164 are rigidly fixed to the frame of the apparatus and that the antifriction rollers 163 carried by the sprocket chain 159 pass through the guideways between associated bars.

Secured to the sprocket chain 159 is a cutting device W which comprises a member 171 fixed to said sprocket chain by means of pins which pass through pivot openings in adjacent links of said sprocket chain. The member 171 is provided with an extension 172 having an elongated slot, and said member 171 is provided with a second extension 173. 174 designates a member pivoted to the member 171 at the point designated by the reference character 175, said member 174 being provided with a pin 176 which extends through the elongated slot in the extension 172 of the member 171. The member 174 is provided with an extension 177 which is spaced apart from the extension 173 on the member 171, and interposed between said extensions 177 and 173 is an expansible coil spring 178 which tends to move the free end of the member 174 upwardly until the pin 176 carried thereby contacts with the upper end of the elongated slot in the extension 172. 179 designates a cutting disk rotatably mounted on a pin 180 carried by the member 174. It is apparent in view of the slot and pin connection between the members 171 and 174, and because of the coil spring 178, that the free end of said member 174 is capable of moving toward the member 171.

Fixed to the shaft 150 (Fig. I) is a bevel gear 181 which meshes with a similar bevel gear 182 fixed to a vertically arranged shaft 183 at the lower end thereof. The shaft 183 is provided with a bevel gear 184 at its upper end which meshes with a similar bevel gear 185 secured to the end of a shaft 186 arranged transversely of the apparatus. The shaft 186 is arranged for rotation in suitable bearings 187, and secured to said shaft at points adjacent to the opposite side faces of the frame of the apparatus are cams 188. 189 designates a member approximately U-shaped having a bar 190 which is extended transversely of the apparatus, said member 189 being provided with antifriction rollers 191 mounted at its opposite ends, which antifriction rollers contact with the cams 188 (Fig. II). The side portions of the U-shaped member 189 are slidably arranged in guideways 192 in the brackets which support the bearings for the pulley E (Fig. XII), and expansible coil springs 193 are interposed between the portions of said brackets and said U-shaped member whereby the antifriction rollers 191 are forced into firm contact with the circumferential faces of the cams 188. The cams 188 are shaped as shown in Fig. XII, said cams each having a high portion provided with a circumferential face 194 and a low portion 195. In the operation of the apparatus, when the low portions of the cams are in contact with the antifriction rollers 191 the U-shaped member will be in its rearmost position, due to the rearward pressure exerted against said member by the coil springs 193. However, during the rotation of the cams the high portions thereof will move into contact with the antifriction rollers 191, and when this happens the U-shaped member, including the transverse bar 190, will be moved forwardly, the concentric faces 194 on said cams retaining said U-shaped member in such forward position during the time said concentric faces are in contact with said antifriction rollers. By referring to Figs. I, XII and XIII it will be noted that the transverse bar 190 is provided with an inclined face 196.

The operation of our improved apparatus is as follows:

Assume that the sheet-forming rolls G are rotating constantly and that the motor 4 is transmitting motion to the gear wheel 9, gear ring 10, gear wheel 11 and shaft 12, and the loop K of rubber has just depressed the pivoted member M of the switch L so as to energize the solenoid S. Upon being energized the solenoid S will draw the arm 36 upwardly, as has already been explained, whereby the one-revolution clutch mechanism will be actuated to permit the shaft 13 to be rotated one complete revolution. The rotary motion of the shaft 13 will be transmitted to the shaft 49 through the agency of the pinion 47 and gear wheel 48, but because the gear wheel 48 is approximately twice the diameter of the pinion 47, the shaft 49 will rotate only one-half of a revolution while the shaft 13 is rotating a complete revolution. It is plain, therefore, that one-half revolution of the shaft 49 will cause the cam 50 to move the arm 52 to the position in which it is shown by dotted lines in Fig. VII, in which position the clutch members 16 and 18 will be in engagement with each other. The rotary motion of the gear wheel 11 will therefore be transmitted to the gear wheel 14, and because said gear wheel 14 is in mesh with the gear wheel 15 on the shaft 1 the endless belt A will be driven.

The gear wheel 114 is in mesh with the gear wheel 15 and the gear ring 116 is in mesh with the gear wheel 114. Consequently, said gear wheel 114 and gear ring 116 will be rotated when the gear wheel 15 is rotated. However, at this particular time, that is, during the initial movement of the endless belt A, the nose portion of the dog 120 carried by the gear ring 116 is at its outermost position; in other words, said nose portion of said dog may pass by the extension 119 on the disk 118 without contacting with it. It is plain, therefore, that as soon as rotary movement is imparted to the gear wheel 15 rotary movement will also be imparted to the gear ring 116, but because said gear ring is not connected to the shaft 117 and due to the fact that the nose portion of the dog 120 is removed from the circumferential face of the disk 118, the shaft 117 will not be rotated and the endless belt D will remain stationary. During the initial movement of the gear ring 116 the nose portion of the dog 120 will pass by the extension 119 without contacting therewith, but because the tail portion of said dog is relatively close to the circumferential face of the disk 118 the cam face 124 on said tail portion will be drawn along in contact with the extension 119, and as a result the tail portion of the pivoted dog 120 will be moved away from the circumferential face of the disk 118 and the nose portion of said pivoted dog will be moved toward and into contact with said circumferential face of said disk. The gear ring 116 will continue to rotate independently of the disk 118 with the nose portion of the dog traveling around said disk in contact with the circumferential face thereof until said nose portion of said disk encounters the extension 119, and because said nose portion of said dog is in proper position to do so, said nose portion will contact with said extension and the extension will be carried around by said nose portion of said dog, thus imparting rotary motion to the shaft 117 and driving the endless belt D. It is apparent, therefore, that the endless belt A is driven independently of the the endless belt D during the period of time required for the dog 120 to make one complete revolution of the disk 118, after which period the belt D is placed in motion as just described.

The free end portion of the sheet of rubber H rests upon the endless belt D and therefore said sheet of rubber will be fed forwardly by the belt D as soon as said belt is placed in motion, said sheet of rubber moving over the end of said belt at the pulley E and passing on to the endless belt A, as shown in Fig I. During the entire time that the endless belt D is in motion, the endless belt A is also in motion, and said belts A and D travel at the same speed, with the result that the sheet of rubber is fed forwardly by both belts.

During the rotation of the shaft 1 to feed the belts, as already described, the pinion 55 at the end of said shaft opposite to the end on which the gear wheel 15 is mounted drives the gear wheel 56 and shaft 57, and because the clutch members 61 and 62 are in engagement at this time the unit 58 will be rotated. The pinion 55 is of much smaller diameter than the gear wheel 56 (Fig. II), hence the shaft 1 is capable of making a number of revolutions while the gear wheel 56 is making one revolution. As already stated, the unit 58 rotates with the gear wheel 56 and eventually the abutment face 84 on the arm 79 associated with said unit will contact with the pivoted member 86, thus causing the electrical contact member 89 on said pivoted arm to be brought into contact with the stationary electrical contact member 90. The result of the contact of these contact members will be that the solenoid S will again be energized, thereby causing the arm 36 to be drawn upwardly and in the manner already described drawing the nose portion 40 of the bell crank lever 38 in a direction away from the arm 26 of the one-revolution clutch mechanism associated with the gear ring 10. The gear ring 10 will thereupon be connected to the shaft 13 in the manner already described, and said shaft will be rotated one complete revolution. The shaft 13, as already stated, is provided with a pinion 47 which meshes with the larger gear wheel 48, and therefore the complete revolution of the shaft 13 will result in the shaft 49 being rotated one-half a revolution, whereby the arm 52 will be moved by the cam 50 from the position in which it is shown by dotted lines in Fig. VII to the position in which it is shown by full lines in said view, whereby the clutch elements 16 and 18 of the clutch 17 will be moved out of engagement with each other, thus causing the traveling belts A and D to be stopped.

To review what has just been said relative to the operation of the apparatus, it is apparent that both of the belts being stopped and the loop of rubber K moving downwardly from the sheet-forming rolls, said loop of rubber contacts with the pivoted member M of the electric switch L and thus energizes the solenoid S. This causes the belt A to be placed in motion and said belt travels a predetermined distance while the belt D is stationary. After said belt A moves the said predetermined distance the belt D is set in motion and both belts then travel at the same time and at the same speed until the solenoid S is again energized, when both belts are stopped.

When the gear wheel 9 is rotating the gear ring 74 will be driven through the agency of the gear wheel 75, but the rotary motion of said gear ring will not be transmitted to the shaft 72. However, each time the solenoid S is energized the shaft 49 is caused to rotate one-half of a revolution. The cam 110 on the shaft 49 is so arranged that when the solenoid S is energized to stop the belts A and D the raised spot 111 will be moved to the position shown in Fig. VI. Therefore, when the shaft 49 is moved one-half of a revolution to stop the belts, the cam 110 moving in the direction indicated by the arrow in Fig. VI will cause the high spot 111 to move the upper end of the arm 107 rearwardly. The rearward movement of the upper end of the arm 107 will cause the nose portion 106 of the arm 104 to be withdrawn from beneath the arm 100 of the one-revolution clutch mechanism associated with the gear ring 74, and said clutch mechanism will be operated to cause the shaft 72 to be rotated one complete revolution.

It will be remembered that the shaft 117, which is the drive shaft for the endless belt D, is driven through the agency of the dog 120, the nose portion of said dog being caused to contact with the extension 119 on the disk 118, and when the belts A and D are stopped, as already described, the nose portion of said dog is, of course, still in contact with said extension 119. Therefore, when the shaft 72 is rotated one revolution the disk 146 will likewise be rotated and therefore the arm 147, bell crank lever 141 and arm 136 will be operated to move the member 133 longitudinally of the sleeve 129. The result of this movement will be that the conical face 133' on said member 133 will force the conically shaped member 128 on the pin 127 outwardly toward the periphery of the gear ring 116, and because said pin 127 is secured to the nose portion of the dog 120 said nose portion of said dog will be moved to a position adjacent to the periphery of the gear ring 116, in which position it may pass by the extension 119 without contacting with same when the gear ring 116 is being rotated. The dog 120 is then in position again for the gear ring 116 to make a complete revolution without imparting movement to the shaft 117. The arrangement for moving the member 133 is such that said member is moved toward the outer end of the sleeve 129 and is restored to its original position during each revolution of the shaft 72.

At the time the member 133 is restoring the dog 120 as just described, the shaft 72 is imparting rotary motion to the shaft 68 and this motion is in turn imparted to the disk 76 which operates the arm 64 to move the clutch member 62 out of engagement with the clutch member 61. When the belts A and D are being driven to feed the sheet of rubber the unit 58 is rotated and the flexible member 93 is wound around the pulley portion 60 of said unit in such manner that the weight 94 attached to said flexible member is drawn upwardly, and when the clutch members 61 and 62 are disengaged, as just described, the elevated weight 94 will drop downwardly by gravity, thereby rotating the loosely mounted unit 58 until the stop 96 thereon strikes an abutment face, whereby further rotation of said unit is prevented. It is therefore plain that during the travel of the belts A and D the unit 58 is rotated until the abutment face 84 on the arm 79 associated therewith trips the pivoted switch member 86 to energize the solenoid S and stop the belts. During the movement of the belts the flexible member is wound around the pulley portion 60 of the unit 58 to elevate the weight 94. The shaft 72 is then rotated one revolution and the clutch members 61 and 62 are disengaged, thus permitting the weight 194 to drop, whereby the flexible member, being drawn downwardly by said weight, will rotate the unit 58 in the reverse direction to return it to its original position.

During the one-revolution movement of the shaft 72 rotary motion is transmitted to the shaft 150, and this motion is in turn transmitted through the mechanism already described to the shaft 186 on which the cams 188 are mounted. The cams 188 move the U-shaped member which includes the transverse bar 190 forwardly so that the inclined face of said bar is located in contact with the rear face of the sheet of rubber at the point where it passes onto the belt A, as shown in Fig. XIII. While the U-shaped member 189 is being moved forwardly as described, the shaft 150 is transmitting traveling motion to the sprocket chain 159, therefore immediately upon the transverse bar 190 being moved to its position in contact with the sheet of rubber the rotary cutting disk 179 will pass transversely of the sheet of rubber, and as the cutting edge of said cutting disk travels along the inclined face of the transverse bar 190 the sheet of rubber will be severed by said cutting disk. The ratio of the gear by which the sprocket chain 159 is driven is such that any one point on said chain makes one complete circuit during one revolution of the shaft 150. In other words, assuming that the position in which the rotary cutter is shown in Fig. XI is its starting position, said rotary cutter will make a complete circuit and come to a stop at that position during one revolution of the shaft 150. Also, because the antifriction rollers carried by the sprocket chain pass through the spaces between the guide bars 164 the cutting edge of the cutting disk 179 will be forced into firm contact with the inclined face of the transverse bar 190, thus making the cutting action of said cutting disk absolutely positive.

Considering now the complete operation of the apparatus, the loop of rubber K actuates the electrical switch L and the solenoid S is energized, whereby the endless belt A is placed in motion. The endless belt A travels a predetermined distance independently of the endless belt D, and after said belt A has traveled said predetermined distance the endless belt D is placed in motion and said belts A and D then travel together and at the same speed to feed the sheet of rubber. Both belts A and D are then stopped simultaneously and the traveling cutter moves transversely of the apparatus, cutting the free end portion of the sheet of rubber from the body portion thereof. Immediately after the free end portion of the sheet of rubber has been cut from the body portion of the sheet of rubber the endless belt A is again placed in motion and the section of the sheet of rubber which was severed from the main body of the sheet is fed forwardly of the apparatus a predetermined distance, approximately 20 inches, this movement taking place while the endless belt D is stationary. It is obvious, therefore, that the end portion of the sheet of rubber is severed from the body portion of the sheet and immediately said severed section is moved so that a space of approximately 20 inches is placed between the severed section and the portion of the sheet from which said section was severed. Therefore, as the severed sections of rubber move successively toward the end of the apparatus a space of approximately 20 inches is present between each adjacent pair of sections of rubber. When each severed section of rubber reaches a predetermined position at the rear end of the apparatus the section of rubber is rolled on a mandrel, this operation taking place while both of the belts are stopped and the belt A functioning as a bed on which said rolling takes place. The rolling of the section of rubber on the mandrel is performed by rolling the mandrel transversely of the endless belt A as suggested in Fig. XVIII, the mandrel being designated by the reference character 200 in said view.

It is apparent that the length of the sections of rubber severed by the cutting mechanism may be regulated by adjusting the arm 79 associated with the unit 58, for it is plain that if the thumb nut 82 were unscrewed and the arm 79 moved about the shaft 57 so that said arm would have to move a greater or less distance from its position of rest for the abutment face 84 to engage the pivoted member 86, the length of the sections of rubber would be correspondingly increased or reduced.

201 designates a brake drum (Fig. VIII) which is fixed to the shaft 1 at a point adjacent to the pinion 55. 202 designates a brake band which is fixed at one of its ends to a bracket 203 secured to the frame of the apparatus and which partially surrounds the brake drum 201. 204 designates a rod which is secured to the free end of the brake band 202. S' designates a solenoid having the usual core 205, and 206 designates a pivoted arm, said arm 206 being so arranged that one of its ends is pivotally attached to the lower end of the core 205 and the opposite end thereof is pivotally attached to the lower end of the rod 204.

It has already been explained that when the belts A and D are in motion said belts are stopped by the abutment face 84 striking the pivoted arm 86 and moving the contact members 89 and 90 into contact with each other, thus energizing the solenoid S. When this contact has been made momentum will cause the moving parts of the apparatus to move a slight distance after the solenoid S has been actuated, and therefore the abutment face 85 which follows immediately behind the abutment face 84 when the unit 58 is rotating will engage the pivoted member 87, thus bringing the contact members 91 and 92 into electrical contact with each other. The contact members 91 and 92 form parts of an electrical circuit through which energy is conducted to the solenoid S', and when said contact members 91 and 92 are moved into contact with each other electrical energy will draw the solenoid core 205 upwardly, thus drawing the rod 204 downwardly and thereby tightening the brake band 202 about the brake drum 201, whereby a braking action will be applied to the belts A and D and certain moving parts of the apparatus associated therewith.

As has been stated several times herein, the shaft 49 is rotated one-half of a revolution during each complete revolution of the shaft 18. It is therefore plain that the raised portion 111 on the disk 110 will not move the upper end of the arm 107 every time the solenoid is energized, but said upper end of said arm 107 will be moved every second time the solenoid is energized. The raised portion of the disk 110 is so located on said disk that the arm 107 will not be moved when the solenoid is energized to start the belt A, but said raised portion will move the upper end of the arm 107 each time the solenoid S is energized to stop the belts. It is therefore plain that because the cutting mechanism W of the apparatus is controlled by the operation of the arm 107 said cutting mechanism will be operated only when the solenoid has been energized to stop the belts.

We claim:

1. An apparatus for making rubber tubes, comprising constantly rotated rolls between which compounded rubber material is passed to produce a continuous sheet of material, means comprising an endless conveyor whereby the free end portion of said sheet of material is intermittently advanced while said sheet is being formed, a portion of said sheet between said rolls and conveyor being in the form of a downwardly extended loop, and means adapted to be actuated by said downwardly extended loop whereby said endless conveyor is placed in motion.

2. An apparatus for making rubber tubes, comprising constantly rotated rolls between which compounded rubber material is passed to produce a continuous sheet of material, means comprising an endless conveyor whereby the free end portion of said sheet of material is intermittently advanced while said sheet is being formed, a portion of said sheet between said rolls and conveyor being in the form of a downwardly extended loop, and electrical means adapted to be actuated by said downwardly extended loop whereby said endless conveyor is placed in motion.

3. An apparatus for making rubber tubes, comprising constantly rotated rolls between which compounded rubber material is passed to produce a continuous sheet of material, means comprising an endless conveyor whereby the free end portion of said sheet of material is intermittently advanced while said sheet is being formed, and electrical means adapted to be automatically actuated to start and stop said endless conveyor.

4. An apparatus for making rubber tubes, comprising constantly rotated rolls between which compounded rubber material is passed to produce a continuous sheet of material, means comprising an endless conveyor whereby the free end portion of said sheet of material is intermittently advanced while said sheet is being formed, and electrical means including a solenoid adapted to be automatically actuated to start and stop said endless conveyor.

5. An apparatus for making rubber tubes comprising constantly rotated rolls between which compounded rubber material is passed to produce a continuous sheet of material, means comprising an endless conveyor whereby the free end portion of said sheet of material is intermittently advanced while said sheet is being formed, a portion of said sheet of material between said rolls and conveyor being in the form of a downwardly extended loop, a solenoid, a starting switch adapted to be actuated by said downwardly extended loop whereby an electric circuit may be closed through which electrical energy may be caused to pass to said solenoid, and means controlled by said solenoid whereby said endless conveyor is placed in motion.

6. An apparatus for making rubber tubes comprising constantly rotated rolls between which compounded rubber material is passed to produce a continuous sheet of material, means comprising an endless conveyor whereby the free end portion of said sheet of material is intermittently advanced while said sheet is being formed, a solenoid, a switch, means cooperable with said endless conveyor adapted to actuate said switch whereby an electric circuit is closed through which electrical energy is caused to pass to said solenoid, and means controlled by said solenoid whereby the motion of said endless conveyor is arrested.

7. An apparatus for making rubber tubes comprising constantly rotated rolls between which compounded rubber material is passed to produce a continuous sheet of material, means comprising an endless conveyor whereby the free end portion of said sheet of material is intermittently advanced while said sheet is being formed, a portion of said sheet of material between said rolls and conveyor being in the form of a downwardly extended loop, a solenoid, a starting switch adapted to be actuated by said downwardly extended loop whereby an electric circuit may be closed through which electrical energy may be caused to pass to said solenoid, means controlled by said solenoid whereby said endless conveyor is placed in motion, a stopping switch, and means cooperable with said endless conveyor adapted to actuate said stopping switch whereby a second electric circuit may be closed through which electrical energy may pass to said solenoid whereby said means controlled by said solenoid may stop the motion of said endless conveyor.

8. An apparatus for making rubber tubes comprising rolls between which compounded rubber material is passed to produce a continuous sheet of material, means comprising an endless conveyor whereby the free end portion of said sheet of material is advanced while said sheet is being formed, electrical means adapted to be actuated to place said endless conveyor in motion and to stop the motion thereof, and adjustable means whereby the duration of the period during which said endless conveyor is in motion may be varied.

9. An apparatus for making rubber tubes comprising rolls between which compounded rubber material is passed to produce a continuous sheet of material, means comprising an endless conveyor whereby the free end portion of said sheet of material is advanced while said sheet is being formed, electrical means adapted to be actuated to place said endless conveyor in motion and to stop the motion thereof, and adjustable means whereby the duration of the period during which said endless conveyor is in motion may be varied, said adjustable means comprising a member movable in synchronism with said endless conveyor and adjustable independently thereof.

10. An apparatus for making rubber tubes comprising rolls between which compounded rubber material is passed to produce a continuous sheet of material, means comprising an endless conveyor whereby the free end portion of said sheet of material is advanced while said sheet is being formed, electrical means adapted to be actuated to place said endless conveyor in motion and to stop the motion thereof, and adjustable means whereby the duration of the period during which said endless conveyor is in motion may be varied, said adjustable means comprising a member adapted to rotate while said endless conveyor is in motion, and a second member associated with said rotatable member and adapted to rotate therewith, the last mentioned member being adapted to actuate said electrical means to stop the endless conveyor and being adjustable relative to said rotatable member to advance or retard the actuation of said electrical means.

11. An apparatus for making rubber tubes comprising rolls between which compounded rubber material is passed to produce a continuous sheet of material, means comprising an endless conveyor whereby the free end portion of said sheet of material is advanced while said sheet is being formed, a portion of said sheet of material between said rolls and conveyor being in the form of a downwardly extended loop, electrical means adapted to be actuated to start and stop the motion of said endless conveyor, a starting switch adapted to be actuated by said downwardly extended loop whereby said electrical means may be actuated to start said endless conveyor, a stopping switch, a member adapted to rotate while said endless conveyor is in motion, a member associated with said rotatable member, the last mentioned member being adapted to actuate said stopping switch and thereby actuate said electrical means to stop the endless conveyor, said last mentioned member being adjustable relative to the rotary member with which it is associated whereby the actuation of said switch may be advanced or retarded.

12. An apparatus for making rubber tubes, comprising rolls between which compounded rubber material is passed to produce a continuous sheet of material, means whereby the free end portion of said sheet of material is advanced while said sheet is being formed, said means comprising a pair of endless conveyors arranged one above the other and said sheet of material being adapted to pass from the upper to the lower endless conveyor, and automatic means whereby the free end portion of the continuous sheet of material is periodically severed from said sheet, said cutting operation taking place at the point where said sheet of material passes from the upper to the lower endless conveyor so that the severed section of the sheet of material is located only on said lower endless conveyor, said automatic cutting means comprising an endless member arranged to travel transversely of the sheet material, and a cutting element carried by said endless traveling member.

13. An apparatus for making rubber tubes, comprising rolls between which compounded rubber material is passed to produce a continuous sheet of material, means whereby the free end portion of said sheet of material is advanced while said sheet is being formed, said means comprising a pair of endless conveyors arranged one above the other and said sheet of material being adapted to pass from the upper to the lower endless conveyor, and automatic means whereby the free end portion of the continuous sheet of material is periodically severed from said sheet, said cutting operation taking place at the point where said sheet of material passes from the upper to the lower endless conveyor so that the severed section of the sheet of material is located only on said lower endless conveyor, said automatic cutting means comprising an endless member arranged to travel transversely of the sheet of material, and a rotary cutting element carried by said endless traveling member.

14. An apparatus for making rubber tubes, comprising rolls between which compounded rubber material is passed to produce a continuous sheet of material, means comprising a pair of endless conveyors whereby the free end portion of said sheet of material is advanced while said sheet is being formed, electrical means adapted to control the movement of said endless conveyors, automatically actuated means whereby said electrical means is operated to place said endless conveyor in motion, automatically operated means adapted to actuate said electrical means to stop said endless conveyor, and automatically operated cutting mechanism adapted to sever the free end portion of the sheet from said sheet, said cutting mechanism being placed in motion by said electrical means when said electrical means is actuated to stop said endless conveyor, and one of said endless conveyors being moved independently of the other endless conveyor after the cutting operation to move the severed section of the sheet of material away from the portion of said sheet from which said severed section was cut.

In testimony that we claim the foregoing we hereunto affix our signatures.

JOHN A. FLEISCHLI.
JOSEPH M. KOUNTZMAN.